(12) United States Patent
Lee

(10) Patent No.: US 8,888,340 B2
(45) Date of Patent: Nov. 18, 2014

(54) HEAD LAMP APPARATUS OF AUTOMOBILE AND METHOD OF CONTROLLING THE SAME

(71) Applicant: HYUNDAI MOBIS Co., Ltd., Yongin-si (KR)

(72) Inventor: Tae won Lee, Yongin-si (KR)

(73) Assignee: HYUNDAI MOBIS Co., Ltd., Yongin-si, Gyeonggi-do (KR)

( * ) Notice: Subject to any disclaimer, the term of this patent is extended or adjusted under 35 U.S.C. 154(b) by 0 days.

(21) Appl. No.: 13/892,691

(22) Filed: May 13, 2013

(65) Prior Publication Data

US 2013/0311049 A1    Nov. 21, 2013

(30) Foreign Application Priority Data

May 21, 2012    (KR) .................. 10-2012-0053677

(51) Int. Cl.
*B60Q 1/00* (2006.01)
*B60Q 1/12* (2006.01)

(52) U.S. Cl.
CPC ............ *B60Q 1/12* (2013.01); *B60Q 2300/322* (2013.01); *B60Q 2300/124* (2013.01); *B60Q 2300/122* (2013.01)
USPC ........... 362/466; 362/464; 362/465; 362/276; 362/469; 701/49; 701/532; 701/1; 701/36; 315/79

(58) Field of Classification Search
CPC combination set(s) only.
See application file for complete search history.

(56) References Cited

U.S. PATENT DOCUMENTS

| | | | |
|---|---|---|---|
| 6,578,993 B2 * | 6/2003 | Kobayashi et al. | 362/466 |
| 6,633,027 B2 * | 10/2003 | Kobayashi et al. | 250/208.1 |
| 7,699,509 B2 * | 4/2010 | Leleve | 362/464 |
| 8,738,235 B2 * | 5/2014 | Laliron et al. | 701/49 |
| 2004/0114379 A1 * | 6/2004 | Miller et al. | 362/464 |
| 2004/0143380 A1 * | 7/2004 | Stam et al. | 701/36 |
| 2006/0028832 A1 * | 2/2006 | Horii et al. | 362/514 |
| 2007/0046239 A1 * | 3/2007 | Hashizume | 318/575 |
| 2007/0052555 A1 * | 3/2007 | Ibrahim | 340/990 |
| 2007/0253210 A1 * | 11/2007 | Hasegawa | 362/464 |
| 2011/0184610 A1 * | 7/2011 | Laliron et al. | 701/49 |
| 2012/0200224 A1 * | 8/2012 | Schofield | 315/79 |
| 2013/0201704 A1 * | 8/2013 | Lin et al. | 362/464 |

FOREIGN PATENT DOCUMENTS

JP    2006-069521 A    3/2006

* cited by examiner

*Primary Examiner* — Helal A Algahaim
*Assistant Examiner* — Paul Castro
(74) *Attorney, Agent, or Firm* — Sherr & Jiang, PLLC

(57) ABSTRACT

A head lamp apparatus of an automobile and a method of controlling the same light a curved road by rotating one of a left DBL and a right DBL to the left or right according to a relative distance reflecting a driving speed of the automobile, not an absolute distance from a driving position of the automobile before the automobile enters the curved road on a driving path.

14 Claims, 4 Drawing Sheets

HEAD LAMP APPARATUS OF AUTOMOBILE AND METHOD OF CONTROLLING THE SAME

CROSS-REFERENCE TO RELATED APPLICATIONS

The present application claims priority to Korean Patent Application Number 10-2012-0053677 filed May 21, 2012, the entire contents of which the application is incorporated herein for all purposes by this reference.

TECHNICAL FIELD

The present invention relates to a head lamp apparatus of an automobile, and a method of controlling the same, and more particularly, to a head lamp apparatus of an automobile including dynamic bend lights (DBLs) disposed rotatably in left and right directions at a front side of the automobile in order to secure visibility for a driver on a curved road, and a method of controlling the same.

BACKGROUND

In general, a head lamp and a taillamp are installed in an automobile in order to brightly light an outside area to secure a clear view of a position where a clear view is not secured, and a turn signal lamp for notifying neighboring automobile drivers of a lane change and a driving direction, or a hazardous situation is installed in the automobile.

Among them, the head lamp provides a high beam mode for securing a clear view by lighting a far distance, and a low beam mode for preventing a driver of an automobile driving in a front side and a driver of an oncoming automobile from being blinded by using a low beam light.

Further, a head lamp, which recognizes a state of surroundings of an automobile through a camera sensor and a controller so that a pattern of light is automatically changed to the high beam mode and the low beam mode, has been released, and a head lamp, which is rotated so as to light in a driving direction of an automobile by changing an irradiation direction of light of the head lamp according to a rotation angle of a steering wheel, has been also released.

SUMMARY

The present invention has been made in an effort to provide a head lamp apparatus of an automobile with improved visibility when a road curves, and a method of controlling the same.

Objects of the present invention are not limited to the objects described above, and other objects that are not described will be clearly understood by a person skilled in the art from the description below.

An exemplary embodiment of the present invention provides a head lamp apparatus of an automobile, comprising: a left dynamic bend light (DBL) disposed at a front-left side of the automobile to light in a front direction; a right DBL disposed at a front-right side of the automobile to light in a front direction; an automobile speed sensing sensor configured to sense a driving speed of the automobile; a global positioning system (GPS) receiving unit configured to receive a driving position of the automobile; and a controller configured to rotate one of the left DBL and the right DBL to the left or right so as to light a curved road when the driving position of the automobile received by the GPS receiving unit is a position from which the automobile arrives at the curved road according to a driving path of the automobile at the driving speed sensed by the automobile speed sensing sensor within a reference time.

Another exemplary embodiment of the present invention provides a method of controlling a head lamp apparatus of an automobile, in which a left dynamic bend light (DBL) disposed at a front-left side of the automobile to light in a front direction and a right DBL disposed at a front-right side of the automobile to light in a front direction are installed, the method including: a first operation of sensing a driving speed of the automobile; a second operation of receiving a driving position of the automobile; and a third operation of rotating one of the left DBL and the right DBL to the left or right so as to light a curved road when the driving position of the automobile received in the second operation is a position from which the automobile arrives at the curved road according to a driving path of the automobile at the driving speed of the automobile sensed in the first operation within a reference time.

Details of other exemplary embodiments are included in the detailed description and the drawings.

According to the head lamp apparatus of the automobile and the method of controlling the same according to the present invention, it is possible to light the curved road by rotating one of the left DBL and the right DBL to the left or right according to a relative distance reflecting the driving speed of the automobile, not the absolute distance from the driving position of the automobile before the automobile enters the curved road according to the driving path to the curved road, thereby improving visibility for a driver.

Further, it is possible to light the curved road by rotating only the left DBL when the driving path is a left turn at the curved road, and light the curved road by rotating only the right DBL when the driving path is a right turn at the curved road, thereby notifying a driver of a driving direction in advance.

Further, the right DBL is rotated in the direction of the steering wheel angle of the steering wheel when the driving path is a left turn at the curved road, and the left DBL is rotated in the direction of the steering wheel angle of the steering wheel when the driving path is a right turn at the curved road. Accordingly, when one of the left DBL and the right DBL lights the curved road, the other one is maintained as it is without rotating until the steering wheel is turned within a predetermined degree, thereby securing a clear view until the automobile enters the curved road.

Further, even though the driving path is not set because the destination is not input in the input unit, the left DBL and the right DBL are rotated in the direction of the steering wheel angle of the steering wheel, thereby lighting the curved road.

The effects of the present invention are not limited to the effects described above, and a person of ordinary skill in the art will clearly understand other effects that are not described from the description of the scope of the claims.

DETAILED DESCRIPTION

Figure 1:
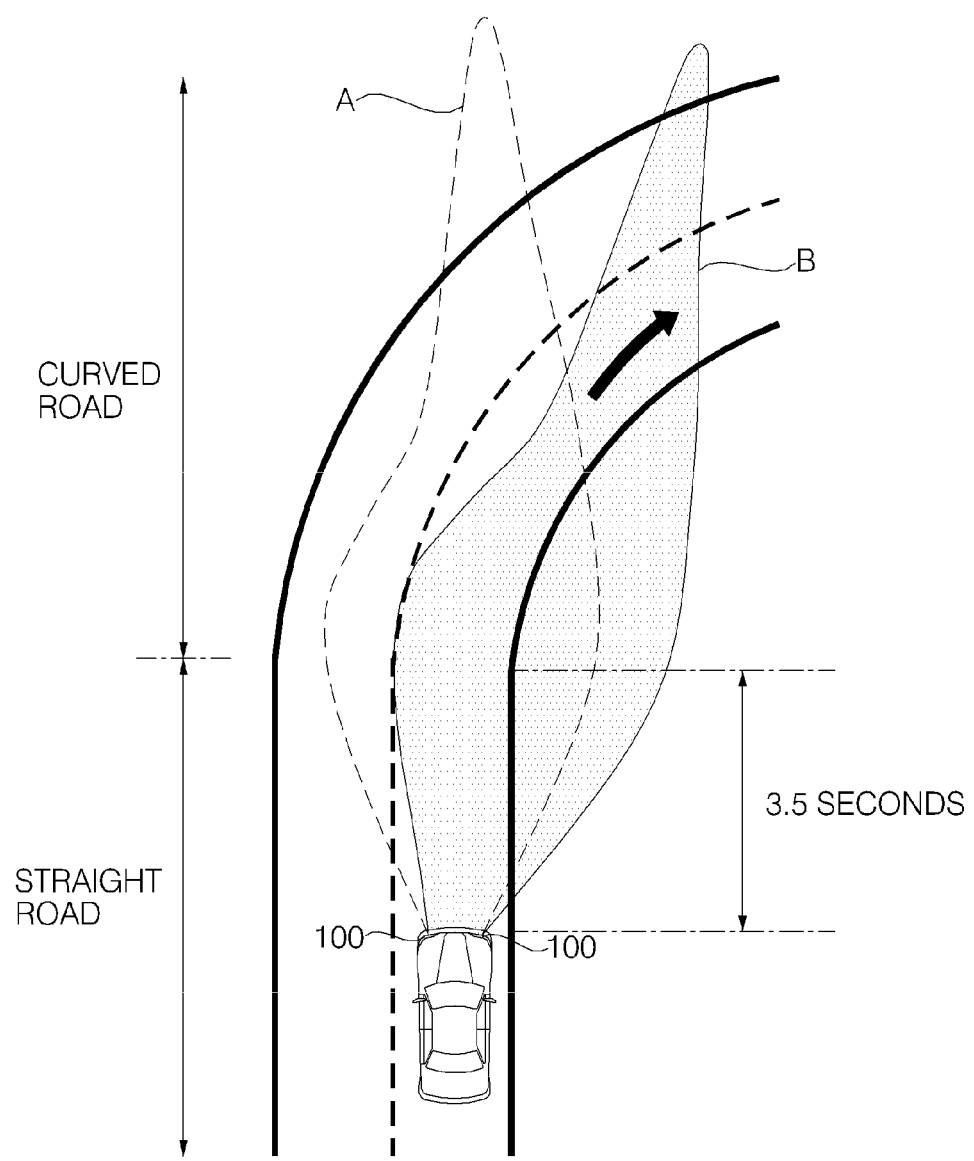
FIG. 1 is a view illustrating a change in a direction of light of a head lamp before an automobile enters a curved road according to an exemplary embodiment of the present invention.

The advantages and characteristics of the present invention and methods for achieving the same will become clear from the embodiments set forth in detail below with reference to the attached drawings. However, the present invention is not limited to the embodiments set forth below, and may be embodied in various other forms. The present embodiments are for rendering the description of the present invention complete and are set forth to provide a complete understanding of the scope of the invention to a person with ordinary skill in the technical field to which the present invention pertains, and the present invention will only be defined by the scope of the claims. Like reference numerals represent like elements throughout the specification.

Hereinafter, a headlamp apparatus of an automobile and a method of controlling the headlamp apparatus of an automobile according to an exemplary embodiment of the present invention will be described with respect to the drawings.

FIG. 1 is a view illustrating a change in a direction of light of a head lamp before an automobile enters a curved road according to an exemplary embodiment of the present invention.

Referring to FIG. 1, head lamps 100 according to the exemplary embodiment of the present invention are installed at front left and right sides of the automobile, respectively.

In a case where the automobile drives a straight road, the head lamps 100 light a region divided as A in FIG. 1, and light a region divided as B 3.5 seconds before the automobile enters a curved road, to enable a driver to secure visibility at the curved road. That is, the head lamps 100 light the region divided as B 3.5 seconds before the automobile enters the curved road by reflecting an automobile speed, not an absolute distance before the automobile enters the curved road during driving on a straight road, so that visibility of the driver for the curved road may be improved.

Figure 2:
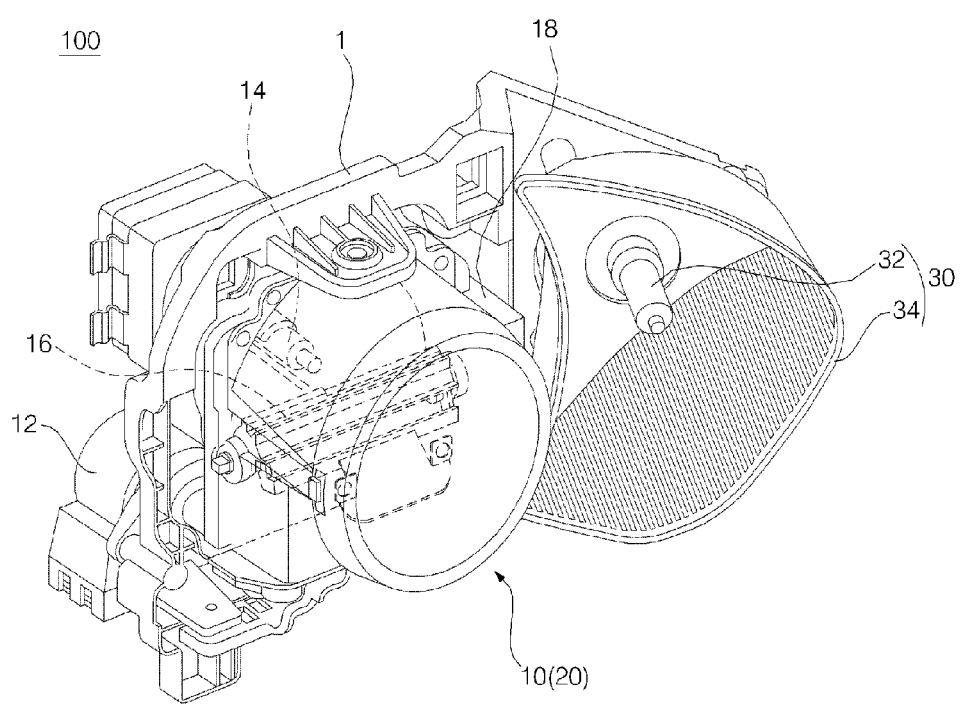
FIG. 2 is a view illustrating the head lamp illustrated in FIG. 1.

FIG. 2 is a view illustrating the head lamp illustrated in FIG. 1.

Referring to FIG. 2, the head lamp 100 includes a dynamic bend light 10 or 20 lighting in a driving direction of the automobile, and a static bend light 30 obliquely lighting in left and right directions with respect to the driving direction of the automobile.

The DBL 10 or 20 is rotatably coupled to a support bracket 1 and connected with an intelligent step motor (ISM) 12, to light forwardly in the driving direction of the automobile while rotating in left and right directions of the automobile by rotation force of the ISM 12. The DBL 10 includes a light source 14 shaped like a bulb generating light, and a shield 16 for preventing a part of light distributed from the light source 14 to the outside is disposed at a front side of the DBL 10. The shield 16 is connected with a smart shield actuator (SSA) 18 to block a part of light distributed to the outside while rotating by rotation force of the SSA 18, thereby changing a pattern of the light distributed to the outside of the automobile according to an outside situation of the automobile (for example, presence or non-presence of a preceding automobile or an opposite automobile).

The SBL 30 is fixedly installed in the support bracket 1. The SBL 30 includes a light source 32 shaped like a bulb generating light, and a reflector 34 for receiving the light source 32 therein and reflecting the light generated from the light source 32 to the outside. The SBL 30 is installed in the support bracket 1 so as to obliquely light in the left and right directions with respect to the driving direction of the automobile.

One head lamp 100 is installed in a front-left side of the automobile and the other head lamp 100 is also installed in a front-right side of the automobile as illustrated in FIG. 1. FIG. 2 illustrates one head lamp 100, but the DBLs 10 and 20 include the left DBL 10 installed at a front-left side of the automobile and the right DBL 20 installed at a front-right side of the automobile.

One of the left DBL 10 and the right DBL 20 is rotated in the left and right directions 3.5 seconds before the automobile enters the curved road to light the curved light, the other one maintains lighting of a straight road and is rotated according to a steering wheel angle of a steering wheel at the time at which the automobile enters the curved road to light the curved road. Accordingly, the driver may also secure a clear view on the curved road while securing a clear view on the straight road before the automobile enters the curved road. This will be described in detail below.

Figure 3:
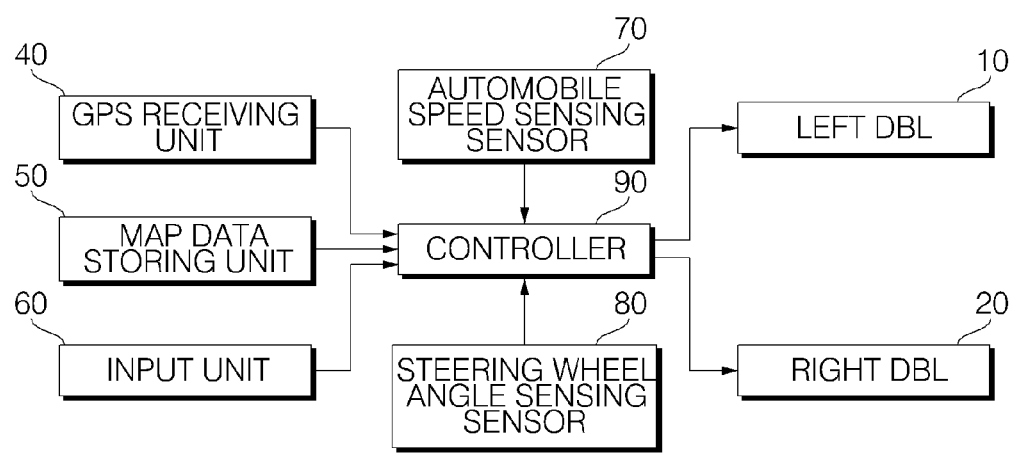
FIG. 3 is a block diagram illustrating a head lamp apparatus of an automobile according to an exemplary embodiment of the present invention.

FIG. 3 is a control block diagram of the head lamp apparatus of the automobile according to the exemplary embodiment of the present invention.

Referring to FIGS. 2 and 3, the head lamp apparatus of the automobile according to the exemplary embodiment of the present invention further includes a global positioning system (GPS) receiving unit 40, a map data storing unit 50, an input unit 60, an automobile speed sensing sensor 70, a steering wheel angle sensing sensor 80, and a controller 90.

The GPS receiving unit 40, the map data storing unit 50, and the input unit 60 may be integrated as a navigation included in the automobile.

The GPS receiving unit 40 receives a driving position of the automobile by receiving current coordinates from a GPS. The GPS receiving unit 40 transmits the driving position of the automobile to the controller 90. Here, the controller 90 may be a subordinate control device included in the navigation, and may also be an electronic control unit (ECU) that is a representative superordinate control device of the automobile communicating with the subordinate control device. Hereinafter, the controller 90 in which the subordinate control device and the superordinate control device are integrated will be described.

Map data is stored in the map data storing unit 50.

The input unit 60 is operated by the driver, so that a destination of the automobile is input in the input unit 60, and the input destination of the automobile is transmitted to the controller 90.

The automobile speed sensing sensor 70 senses a driving speed of the automobile and transmits the sensed driving speed to the controller 90.

The steering wheel angle sensing sensor 80 senses a steering wheel angle (SWA) of a steering wheel (not illustrated), which is a steering handle of the automobile, and transmits the sensed steering wheel angle to the controller 90.

The controller 90 maps a driving path from the driving position received by the GPS receiving unit 40 to the destination input in the input unit 60 with the map data stored in the map data storing unit 50 to set the driving path, and when the driving position received by the GPS receiving unit 40 is a position from which the automobile arrives at the curved road according to the driving path at the driving speed sensed by the automobile speed sensing sensor 70 within a reference time, the controller 90 may light the curved road by rotating one of the left DBL 10 and the right DBL 20 in the left and right directions. In the present exemplary embodiment, the reference time is set to 3.5 seconds in the controller 90. That is, the controller 90 lights the curved road by rotating one of the left DBL 10 and the right DBL 20 in the left and right directions at the position from which the automobile arrives at the curved road at the driving speed sensed by the automobile speed sensing sensor 70 within 3.5 seconds, to light the curved road according to a relative distance reflecting the driving speed of the automobile, not an absolute distance from the driving position of the automobile to the curved road, thereby improving visibility of the driver. Here, the reference time may be set to a different time from 3.5 seconds.

When the driving path is a left turn at the curved road at a position from which the automobile arrives at the curved road at the driving speed sensed by the automobile speed sensing sensor 70 within 3.5 seconds, the controller 90 rotates the left DBL 10 to the left. In this case, the controller 90 maintains the right DBL 20 as it is without rotating the right DBL 20 to the left, and when the driver rotates the steering wheel to the left at a time at which the automobile enters the curved road, the right DBL 20 may be rotated to the left according to the steering wheel angle of the steering wheel. That is, when the driving path is the left turn at the curved road, the controller 90 rotates the right DBL 20 in the direction of the steering wheel angle sensed by the steering wheel angle sensing sensor 80.

Further, when the driving path is a right turn at the curved road, the controller 90 rotates the right DBL 20 to the right at the position from which the automobile arrives at the curved road at the driving speed sensed by the automobile speed sensing sensor 70 within 3.5 seconds. In this case, the controller 90 maintains the left DBL 10 as it is without rotating the left DBL 10 to the right, and when the driver rotates the steering wheel to the right at a time at which the automobile enters the curved road, the left DBL 10 may be rotated to the right according to the steering wheel angle of the steering wheel. That is, when the driving path is the right turn at the curved road, the controller 90 rotates the left DBL 10 in the direction of the steering wheel angle sensed by the steering wheel angle sensing sensor 80.

Further, when a destination is not input in the input unit 60, the controller 90 rotates all of the left DBL 10 and the right DBL 20 in the direction of the steering wheel angle sensed by the steering wheel angle sensing sensor 80. That is, when the destination is not input in the input unit 60, the controller 90 does not set the driving path, thereby failing to obtain data on the curved road. Accordingly, in a case where the destination is not input in the input unit 60, when the driver steers the steering wheel on the curved road, the controller 90 enables the left DBL 10 and the right DBL 20 to be rotated in the direction of the steering wheel angle of the steering wheel. Accordingly, even though the driving path is not set, the left DBL 10 and the right DBL 20 are rotated according to the steering wheel angle of the steering wheel, so that the driver may secure visibility for the curved road.

Figure 4:
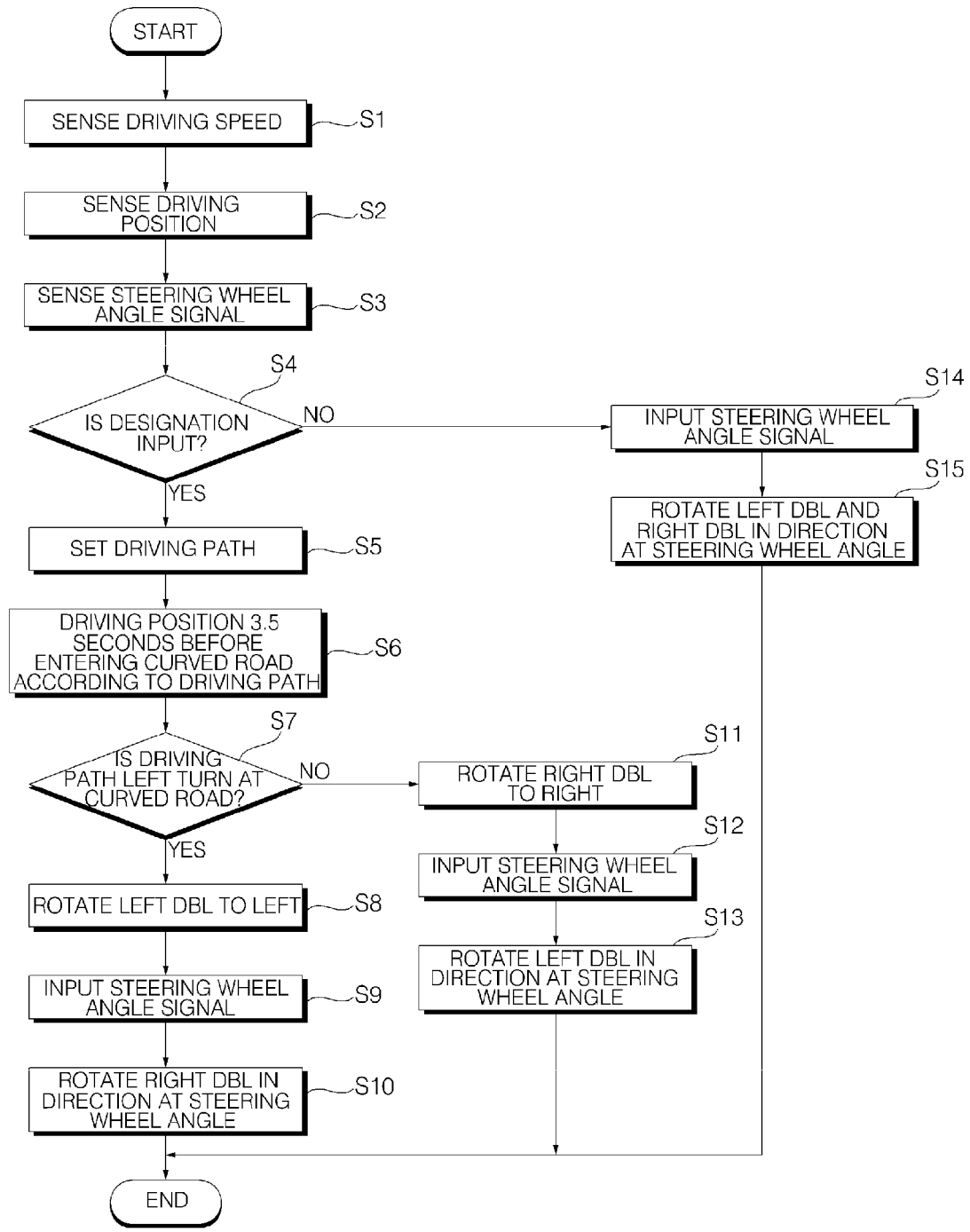
FIG. 4 is a flowchart illustrating a method of controlling the head lamp apparatus of the automobile according to an exemplary embodiment of the present invention.

FIG. 4 is a flowchart of a method of controlling the head lamp apparatus of the automobile according to the exemplary embodiment of the present invention. Here, the method of controlling the head lamp apparatus of the automobile according to the exemplary embodiment of the present invention will be described in connection with the operation of the head lamp apparatus of the automobile according to the exemplary embodiment of the present invention.

Referring to FIGS. 1 to 4, the automobile drives at night at a state where all of the left DBL 10 and the right DBL 30 are turned on. The automobile lights the region divided as A in FIG. 1 on the straight road during the night driving, and one of the left DBL 10 and the right SBL 20 is rotated to the left or right at a point, from which the automobile enters the curved road after 3.5 seconds, to light the region divided as B in FIG. 1. This will be described in detail below.

The automobile speed sensing sensor 70 senses a driving speed of the automobile during the driving of the automobile (S1), the GPS receiving unit 40 receives a driving position of the automobile (S2), and the steering wheel angle sensing sensor 80 senses a steering wheel angle of the steering wheel (S3).

Further, a driver inputs a destination in the input unit 60 (S4).

When the destination is input in the input unit 60, the controller 90 maps a driving path from the driving position received by the GPS receiving unit 40 to the destination input in the input unit 60 with the map data stored in the map data storing unit 50 to set the driving path (S5).

Then, the controller 90 determines whether the driving position received by the GPS receiving unit 40 is a position according to the driving path from which the automobile arrives at the curved road according to the driving path at the driving speed sensed by the automobile speed sensing sensor 70 within a reference time of 3.5 seconds (S6).

Then, when the driving position of the automobile is the position from which the automobile arrives at the curved road within 3.5 seconds, the controller 90 determines whether the driving path is a left turn at the curved road (S7).

Then, when the driving path is the left turn at the curved road, the controller 90 may light the curved road in advance by rotating the left DBL 10 to the left (S8). That is, when the driving path is the left turn at the curved road, the controller 90 lights the curved road in advance by rotating the left DBL 10 to the left 3.5 seconds before the automobile enters the curved road at a current speed, thereby enabling the driver to secure a clear view for the curved road in advance.

Then, the driver rotates the steering wheel to the left in order to drive the curved road at a time at which the automobile enters the curved road after 3.5 seconds. When the driver rotates the steering wheel to the left as described above, a steering wheel angle signal sensed by the steering wheel angle sensing sensor 80 is input in the controller 90 (S9).

Then, when the steering wheel angle signal is input from the steering wheel angle sensing sensor 80, the controller 90 rotates the right DBL 20 in a direction at a steering wheel angle of the steering wheel (S10). That is, when the driving path is the left turn at the curved road, the controller 90 makes the left DBL 10 light the curved road by rotating the left DBL 10 to the left at a point from which the automobile enters the curved road after 3.5 seconds. At this time, the right DBL 20 maintains current lighting before the automobile enters the curved road, and the controller 90 rotates the right DBL 20 to the left according to the steering wheel angle signal input when the driver rotates the steering wheel to the left at a time at which the automobile enters the curved road after 3.5 seconds, so that it is possible to secure a clear view for the curved road through the left DBL 10 in advance, and to secure a clear view until the automobile enters the curved road through the right DBL 20.

In the meantime, when the driving path is not the left turn at the curved road in step S7, the controller 90 determines that the driving path is a right turn at the curved road, to make the right DBL 20 light the curved road in advance by rotating the right DBL 20 to the right (S11). That is, when the driving path is the right turn at the curved road, the controller 90 makes the right DBL 20 light the curved road in advance by rotating the right DBL 20 to the right 3.5 seconds before the automobile enters the curved road at a current speed, thereby enabling the driver to secure a clear view for the curved road in advance.

Then, the driver rotates the steering wheel to the right in order to drive the curved road at a time at which the automobile enters the curved road after 3.5 seconds. As described above, when the driver rotates the steering wheel to the right, the steering wheel angle signal sensed by the steering wheel angle sensing sensor 80 is input in the controller 90 (S12).

Then, when the steering wheel angle signal is input from the steering wheel angle sensing sensor 80, the controller 90 rotates the left DBL 10 in a direction at the steering wheel angle of the steering wheel (S13). That is, when the driving path is the right turn at the curved road, the controller 90 makes the right DBL 20 light the curved road by rotating the right DBL 20 to the left at the point from which the automobile enters the curved road after 3.5 seconds. At this time, the left DBL 10 maintains current lighting before the automobile enters the curved road, and the controller 90 rotates the left DBL 10 to the right according to the steering wheel angle signal input when the driver rotates the steering wheel to the right at a time at which the automobile enters the curved road after 3.5 seconds, so that it is possible to secure a clear view for the curved road through the right DBL 20 in advance, and to secure a clear view until the automobile enters the curved road through the left DBL 10.

In the meantime, when the destination is not input in the input unit 60 in step S4, the controller 90 does not set the driving path, thereby failing to obtain data on the curved road. In a case where the destination is not input in the input unit 60, when the steering wheel angle signal sensed by the steering wheel angle sensing sensor 80 when the driver steers the steering wheel at the curved road is input (S14), the controller 90 makes the left DBL 10 and the right DBL 20 rotate in the direction of the steering wheel angle of the steering wheel (S15). Accordingly, even though the driving path is not set, the left DBL 10 and the right DBL 20 are rotated according to the steering wheel angle of the steering wheel, thereby securing visibility for the curved road.

As described above, according to the head lamp apparatus of the automobile and the method of controlling the same according to the present invention, it is possible to light the curved road by rotating any one of the left DBL 10 and the right DBL 20 to the left or right according to the relative distance reflecting the driving speed of the automobile, not the absolute distance from the driving position of the automobile before the automobile enters the curved road according to the driving path of the automobile to the curved road, thereby improving visibility of the driver.

Further, it is possible to light the curved road by rotating only the left DBL 10 when the drive path is a left turn at the curved road, and to light the curved road by rotating only the right DBL 20 when the drive path is a right turn at the curved road, thereby notifying the driver of a driving direction in advance.

Further, since the right DBL 20 is rotated in the direction of the steering wheel angle of the steering wheel when the drive path is a left turn at the curved road, and the left DBL 10 is rotated in the direction of the steering wheel angle of the steering wheel when the drive path is a right turn at the curved road, when one of the left DBL 10 and the right DBL 20 lights the curved road, the other one is maintained as it is without rotating until the steering wheel is turned within a predetermined degree, so that it is also possible to secure a clear view until the automobile enters the curved road.

Further, even though the driving path is not set because the destination is not input in the input unit 60, the left DBL 10 and the right DBL 20 rotate in the direction of the steering wheel angle of the steering wheel, so that it is possible to light the curved road.

Those skilled in the art will appreciate that the present invention can be implemented in other detailed embodiments, without departing from the technical spirit and essential features of the invention. Therefore, it should be understood that the above-described embodiments are only illustrative in all aspects, not restrictive. The scope of the present invention should be defined by the accompanying claims rather than the detailed description. Various modifications, additions and substitutions derived from the meaning and scope of the accompanying claims and equivalent concept thereof should be interpreted as being included in the scope of the present invention.

What is claimed is:

1. A head lamp apparatus of an automobile, comprising:
a left headlight disposed at a front-left side of the automobile configured to direct light in front of the automobile;
a right headlight disposed at a front-right side of the automobile configured to direct light in front of the automobile;
an automobile speed sensing sensor configured to sense a driving speed of the automobile;
a global positioning system (GPS) receiving unit configured to receive a driving position of the automobile;
a controller configured to rotate one of the left headlight and the right headlight to direct light toward a curved road when the driving position of the automobile received by the GPS receiving unit is an approximate predetermined driving time prior to the automobile turning with the curved road, wherein the approximate predetermined driving time is based on a driving path of the automobile at the driving speed sensed by the automobile speed sensing sensor; and
a steering wheel angle sensing sensor configured to sense a steering wheel angle of a steering wheel,
wherein when the driving path turns left with the curved road, the controller rotates the left headlight to the left at the approximate predetermined driving time prior to when the automobile is projected to enter the curved road,
wherein the controller rotates the right headlight in a direction of the steering wheel angle sensed by the steering wheel angle sensing sensor, and
wherein the rotation of the right headlight occurs approximately when the automobile enters the curved road, which is approximately the predetermined driving time after the rotation of the left headlight.

2. The head lamp apparatus of claim 1, further comprising:
a map data storing unit in which map data is stored; and
an input unit in which a destination is input,
wherein the driving path is set by mapping the driving path with the map data stored in the map data storing unit from the driving position received by the GPS receiving unit to the destination input in the input unit.

3. The head lamp apparatus of claim 1, wherein when the driving path turns right with the curved road, the controller rotates the right headlight to the right at the approximate predetermined driving time prior to when the automobile is projected to enter the curved road.

4. The head lamp apparatus of claim 3,
wherein the controller rotates the left headlight in a direction of the steering wheel angle sensed by the steering wheel angle sensing sensor, and
wherein the rotation of the left headlight occurs approximately when the automobile enters the curved road, which is approximately the predetermined driving time after the rotation of the right headlight.

5. The head lamp apparatus of claim 2,
wherein when the destination is not input in the input unit, the controller rotates the left headlight and the right headlight in response and in a direction of the steering wheel angle sensed by the steering wheel angle sensing sensor.

6. A method of controlling a head lamp apparatus of an automobile, in which a left headlight disposed at a front-left side of the automobile and a right headlight disposed at a front-right side of the automobile, wherein both the left headlight and the right headlight are configured to direct light in front of the automobile, the method comprising:
- a first operation of sensing a driving speed of the automobile;
- a second operation of receiving a driving position of the automobile; and
- a third operation of rotating one of the left headlight and the right headlight to direct light toward a curved road when the driving position of the automobile received in the second operation is an approximate predetermined driving time prior to the automobile turning with the curved road, wherein the approximate predetermined driving time is based on a driving path of the automobile at the driving speed sensed in the first operation;
- sensing a steering wheel angle of a steering wheel; and
- a fourth operation of rotating the right headlight in a direction of the steering wheel angle when the driving path turns left with the curved road,
- wherein the third operation includes rotating the left headlight to the left when the driving path turns left with the curved road at the approximate predetermined driving time prior to when the automobile is projected to enter the curved road, and
- wherein the rotating of the right headlight occurs approximately when the automobile enters the curved road, which is approximately the predetermined driving time after the rotation of the left headlight.

7. The method of claim 6, wherein the driving path is set by mapping the driving path based on map data stored in a map data storing unit, based on the driving position of the automobile received in the second operation, and based on a destination input in an input unit of the automobile.

8. The method of claim 6, wherein the third operation includes rotating the right headlight to the right when the driving path turns right with the curved road at the approximate predetermined driving time prior to when the automobile is projected to enter the curved road.

9. The method of claim 8, further comprising;
- a fourth operation of rotating the left headlight in a direction of the steering wheel angle when the driving path turns right with the curved road,
- wherein the rotating of the left headlight occurs approximately when the automobile enters the curved road, which is approximately the predetermined driving time after the rotation of the right headlight.

10. The method of claim 7,
wherein the third operation rotates the left headlight and the right headlight in response and in a direction of the steering wheel angle when the destination is not input in the input unit.

11. The head lamp apparatus of claim 1, wherein the right headlight and the let headlight are dynamic bend lights.

12. The head lamp apparatus of claim 1, wherein the approximate predetermined driving time is approximately 3.5 seconds.

13. The method of claim 6, wherein the right headlight and the let headlight are dynamic bend lights.

14. The method of claim 6, wherein the approximate predetermined driving time is approximately 3.5 seconds.

* * * * *